2,999,890
United States Patent Office
Patented Sept. 12, 1961

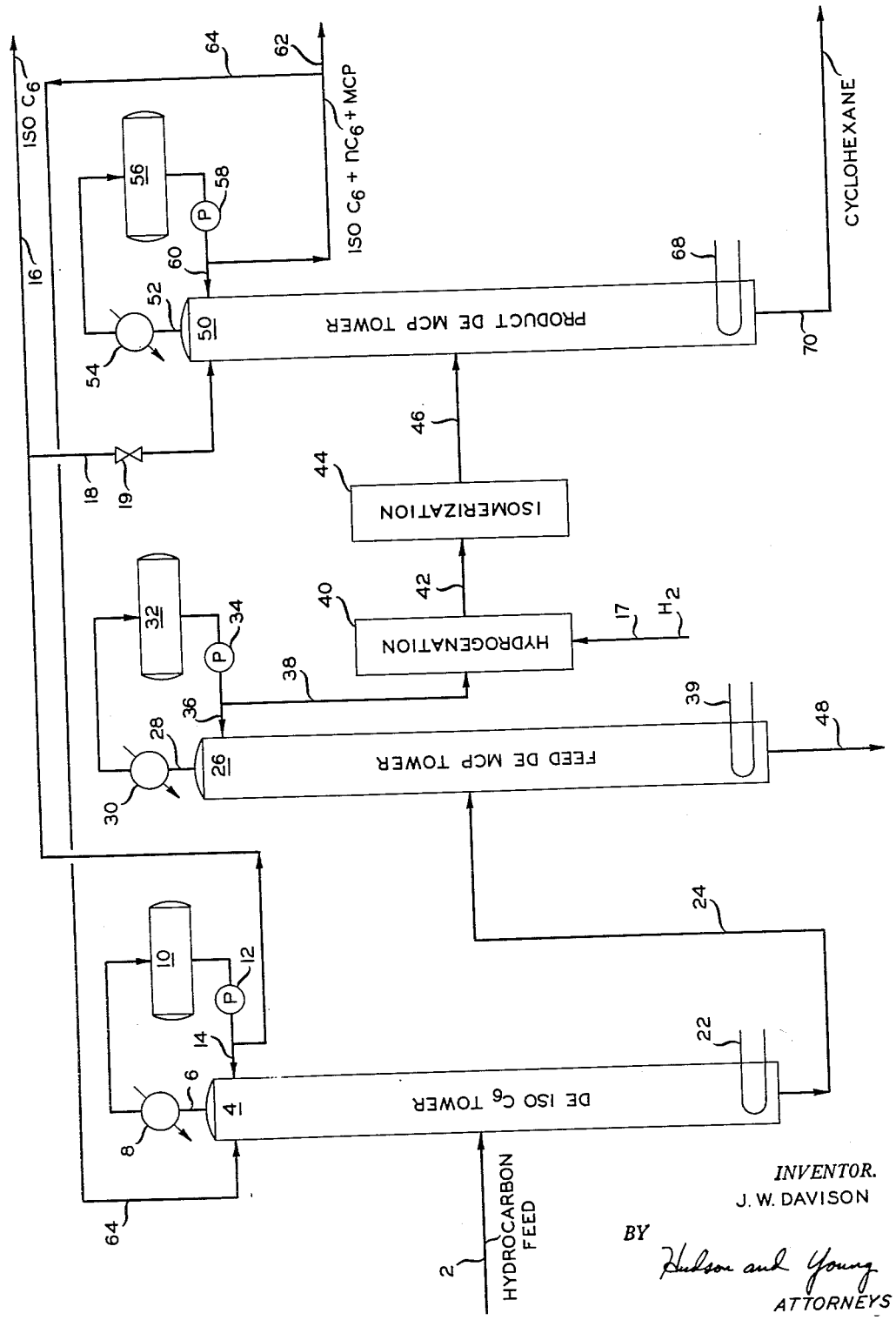

2,999,890
PROCESS FOR ISOMERIZATION OF HYDROCARBONS
Joseph W. Davison, Bartlesville, Okla., assignor to Phillips Petroleum Company, a corporation of Delaware
Filed Dec. 21, 1959, Ser. No. 860,764
13 Claims. (Cl. 260—666)

This invention relates to an improved process for the isomerization of hydrocarbons. In one aspect it relates to a process for increasing the efficiency of hydrocarbon feed fractionation in the isomerization of normal hexane and methylcyclopentane. In another aspect it relates to a process for increasing the efficiency of separating components of reaction effluent from the isomerization of normal hexane and methylcyclopentane.

Various hydrocarbon fractions of petroleum contain large amounts of naphthenic compounds and normal paraffins. Many of these compounds are relatively useless in their original form; however, they can be converted to valuable materials which are useful in motor fuels or as starting materials in chemical processes. Thus, for example, normal hexane which has a low octane number can be converted to isohexanes which have high octane numbers and form valuable components of motor fuels. Also, for example a compound, such as methylcyclopentane can be converted to cyclohexane which is a starting material in the manufacture of nylon fibers.

It is an object of this invention to provide an improved process for the isomerization of hydrocarbons.

Another object of this invention is to provide an improved process for the isomerization of a feed material comprising normal hexane and methylcyclopentane.

Still another object of this invention is to provide improved efficiency in the fractionation of a hydrocarbon feed for an isomerization process.

Yet another object of this invention is to provide an improved process for separating components of reaction effluent from the isomerization of hydrocarbons.

These and other objects of the invention will become more readily apparent from the following detailed discussion and drawing which is a schematic flow diagram of the process of my invention.

The foregoing objects are achieved broadly by fractionating a hydrocarbon feed comprising isohexanes, methylcyclopentane, and n-hexane to separate an overhead product rich in isohexanes and provide an isomerization feed material rich in methylcyclopentane and n-hexane. Following isomerization in which n-hexane is isomerized to isohexanes and methylcyclopentane is converted to cyclohexane, the isomerization reaction effluent is fractionated to recover cyclohexane and an overhead stream containing methylcyclopentane and at least a portion of said overhead stream is utilized as reflux in the first fractionation zone.

In one aspect of the invention a portion of the overhead product rich in isohexanes which is obtained from the first fractionation is utilized as reflux in the isomerization product fractionation zone.

The effluent from the isomerization of n-hexane and methylcyclopentane contains not only the product isomers, isohexanes and cyclohexane, but also substantial amounts of unconverted feed materials. In the usual method of operation more complete utilization of the feed materials is obtained by recovering unreacted feed components, usually by additional fractionation steps, and returning said components to the isomerization reaction zone. In the method of this invention the same result is accomplished but without the necessity of additional fractionation equipment. My method of operation also provides increased recovery of isohexanes, one of the valuable isomerization reaction products and also permits high purity cyclohexane to be recovered. A still further advantage of my process over the conventional method of operation lies in the heat economy obtained by reducing the quantity of overhead material returned to the fractionation zones as reflux. My process therefore possesses a number of advantages which are reflected by economy of operation and by increased yields of valuable isomerization products.

The isomerization of normal hexane and methylcyclopentane in the method of this invention is carried out usually at a temperature of between about 90° F. and about 160° F., the particular temperature employed being dependent on the composition of the material to be converted. The isomerization reaction is preferably carried out under sufficient pressure to provide a liquid phase reaction, namely a pressure in the range of between about 150 and 300 p.s.i.g. The contact or residence time of the reactants in the reactor varies usually between about 0.1 and about 5 hours.

The catalysts employed in carrying out the isomerization reaction comprise metal halides, such as aluminum chloride, aluminum bromide, boron trifluoride and the halides of such metals as zinc, tin, arsenic, antimony, zirconium, beryllium, titanium, iron, and the like. These catalysts are especially effective when present as complexes which are formed by interaction between the metal halides and hydrocarbons present in the reaction system. A particularly desirable isomerization catalyst is the complex of hydrocarbon with aluminum chloride. In addition to the catalyst it is desirable that the correspondiing hydrogen halide be present in the reaction zone since this material maintains catalyst activity at a high level. The reaction rate and the conversion of the hydrocarbon feed is dependent on the amount of aluminum chloride in the aluminum chloride-hydrocarbon complex. Thus, to maintain a normal hexane conversion of about 55 percent, the catalyst complex should contain 60 to 62 percent aluminum chloride. However, the quantity of aluminum chloride in the complex can be varied over wide ranges to provide a corresponding range of feed reactant conversion. While the over-all activity of the catalyst is established by the aluminum chloride content, as stated, the presence of hydrogen chloride is required to provide a high activity. Usually the quantity of hydrogen chloride present is between about 2 and about 6 weight percent of the feed with about 4 weight percent being preferred. The hydrocarbon-to-catalyst ratio is also an important factor in the isomerization reaction rate and generally this ratio is maintained between about 0.8:1 and about 1.4:1 although ratios as high as 5 to 1 can be used if reaction temperatures are increased.

The removal of contaminants, namely benzene and sulfur, from the isomerization feed is effected by contacting said feed with a hydrogenation catalyst, such as hydrated nickel, and hydrogen under suitable conditions of elevated temperature, usually between about 360 and about 500° F. Pressure does not appreciably affect the hydrogenation reaction and the actual pressure employed is established principally by the partial pressure of the hydrogen present. Usually the liquid hourly space velocity is between about 1 and about 3 cubic feet of liquid feed per cubic foot of catalyst per hour. Operation with an excess of hydrogen is preferred; therefore, it is desirable that more than the 3 mols necessary to convert each mol of benzene be present in the reaction zone. Preferably, the hydrogen concentration is such as to provide a hydrogen-to-benzene ratio of between about 4 and 16 mols/mol.

As a result of the preceding operation benzene is hydrogenated and converted to cyclohexane, which is one of the desired products of the isomerization reaction; and the sulfur in the feed material reacts with the nickel catalyst, converting said catalyst to nickel sulfide. The latter reaction inactivates the catalyst; therefore, periodically it is necessary to withdraw and dump the spent catalyst and add fresh catalyst to the system.

In order to more fully describe the invention in its various process steps and provide a better understanding thereof, reference is made to the accompanying drawing which is a diagrammatic illustration of a feed fractionation section, benzene hydrogenation unit, isomerization unit and product fractionation of the effluent from the isomerization unit.

Referring to the drawing a mixture of n-hexane, methylcyclopentane, cyclohexane, and various isohexanes, containing a small amount of benzene, is introduced through conduit 2 to fractionator 4 wherein this material is fractionated to provide an overhead product rich in isohexanes. Heat required for the separation is provided by introducing steam or other heat exchange fluid to reboiler 22 which is disposed in the lower portion of the fractionator. These overhead gases from the fractionator, which contain a substantial amount of methylcyclopentane, pass through conduit 6, condenser 8 and into accumulator 10. Liquid is withdrawn from the accumulator by pump 12 and divided, with a portion being returned to the fractionator through conduit 14 as reflux and the remainder being yielded through conduit 16. An additional quantity of reflux is introduced to fractionator 4 through conduit 64. This material which comprises a mixture containing substantial amounts of isohexanes, n-hexane and methylcyclopentane is obtained from the fractionation of the isomerization effluent, which operation will be described hereinafter in more detail. According to one aspect of my invention no material is refluxed through conduit 14, all of the reflux being obtained from conduit 64.

The additional reflux stream contains greater amounts of methylcyclopentane and n-hexane than is present in the equilibrium mixture leaving the top of the fractionating tower. As a result these materials, which form the heavier components of the reflux, are in part released from the reflux, pass downwardly through the fractionating tower and are recovered in the bottoms product, which is removed from the tower through conduit 24. The tower bottoms are thus substantially increased in volume, primarily by additional amounts of n-hexane and methylcyclopentane.

The amount of auxiliary reflux employed in carrying out the invention can vary from small quantities to a relatively large proportion of the total reflux and, depending on the amount of this material available, can be utilized to completely replace the normal reflux, i.e. condensed overhead from the fractionating tower. The auxiliary reflux comprises material which would normally be yielded from the unit in the condensed state. This material can be employed, therefore, as reflux without additional cooling, and since it supplants normal reflux, a heat economy can be effected through reduction of the flow of overhead vapors through condenser 8.

The basis for this reduction in overhead vapor lies in the fact that the auxiliary reflux is richer in methylcyclopentane and n-hexane than is the normal reflux in line 14. Methylcyclopentane and n-hexane are the principal constituents of the tower 4 bottoms product. On the other hand, as will be shown more clearly later, this economy need not be made at the expense of condenser load on the fractionator for the isomerization effluent because this tower can be operated on auxiliary reflux which is richer in cyclohexane than its normal reflux, cyclohexane being the principal constituent of the bottoms product of the isomerization effluent fractionator. This enables a reduction in the amount of cooling water and cooling surface required in condenser 8. As stated previously, the auxiliary reflux can range from a relatively small amount up to the amount required to completely replace the normal reflux. Usually, however, the auxiliary reflux will be at least 20 volume percent of the total reflux introduced to the fractionator and preferably over 50 percent of the total reflux is auxiliary reflux.

The bottoms from fractionator 4, substantially increased in methylcyclopentane and n-hexane, are introduced to demethylcyclopentanizer tower 26. In this tower which is reboiled by heater 39 methylcyclopentane, n-hexane and lighter materials are separated and passed overhead through conduit 28, condenser 30 and into accumulator 32. The accumulated liquid is withdrawn through pump 34, a portion is returned to the tower through conduit 36 as reflux and the remainder is introduced through conduit 38 to hydrogenation unit 40. The bottoms from the demethylcyclopentanizer, withdrawn through conduit 48, comprise higher boiling components such as heptanes and cyclohexane. It will be apparent that if the original feed in line 2 does not contain these higher boiling components, the demethylcyclopentanizer will not be needed.

In the benzene hydrogenation unit the normal hexane and methylcyclopentane feed in line 38 is contacted with a hydrogenation catalyst in the presence of hydrogen whereby the benzene present in the feed is converted to cyclohexane and sulfur compounds are converted to hydrogen sulfide or are reacted with the hydrogenation catalyst, or both. The hydrogen required for this purpose, including recycle hydrogen, is provided to the hydrogenation unit through conduit 17. Various hydrogenation catalysts can be employed including such materials as nickel, platinum, and palladium, associated with supporting materials such as silica, alumina, kieselguhr and various synthetic and natural clays. When a nickel catalyst is utilized, any sulfur present in the feed reacts with the nickel converting the catalysts to nickel sulfide. Since nickel sulfide does not promote the hydrogenation reaction, removal of sulfur from the feed in this manner in effect poisons the catalyst which makes it necessary to periodically shut down the reactor for removal of contaminated catalyst and addition of fresh catalyst. In order to provide continuous operation, it is therefore desirable to provide a plurality of reactors arranged so that the flow therethrough can be in series or in parallel, depending on whether or not a reactor is withdrawn from service.

The effluent from the benzene dehydrogenation unit, now free from benzene and sulfur, is passed through conduit 42 to the hexane isomerization unit 44. In the isomerization unit n-hexane and methylcyclopentane are brought in contact with an isomerization catalyst, for example, an aluminum hydrochloride-hydrocarbon complex under suitable reaction conditions to provide conversion of the n-hexane to isohexanes and methylcyclopentane to cyclohexane. The principal product formed in the isomerization of the n-hexane is 2-methylpentane; however, in addition three other isomers are formed, namely 2,2-dimethylbutane, 2,3-dimethylbutane and 3-methylpentane. While the metal halides and in particular aluminum halides are preferred catalysts, it is within the scope of the invention to employ other catalysts in this operation. For a more detailed discussion and explanation of the hexane isomerization process and also the benzene hydrogenation, reference is made to the co-pending application of L. E. Dean, Serial No. 698,607, filed November 25, 1957, now U.S. Patent No. 2,953,606, issued September 20, 1960, wherein these processes are set forth and described in detail.

Upon leaving the reaction zone, the isomerization reaction effluent is treated for the removal of catalyst and hydrogen chloride in a series of conventional steps (not shown), after which the effluent is introduced to the product demethylcyclopentanizer tower 50. In fractionator 50 separation is effected between cyclohexane and the lighter materials of the isomerization effluent, which comprise various isohexanes, n-hexane and methylcyclopentane. The heat required for this purpose is provided by reboiler 68. A stream rich in cyclohexane is withdrawn from fractionator 50 as a bottoms product through conduit 70. The overhead from the fractionator comprising isohexanes, n-hexane and methylcyclopentane is withdrawn through conduit 52, condenser 54 and is introduced to accumulator 56. From the accumulator the condensed overhead material passes through pump 58 with a portion being returned through line 60 to fractionator 50 as reflux. Of the remainder of the condensed overhead material a portion is transferred through conduit 64 to the deisohexanizer tower 4 as reflux, and the rest is yielded from the unit through conduit 62. The portion of the demethylcyclopentanizer overhead which is transferred through conduit 64 constitutes the auxiliary reflux material which was previously discussed while considering the operation of fractionator 4.

The separation which is effected in the demethylcyclopentanizer tower can be improved by introducing to this tower, as reflux a portion of the overhead product from the deisohexanizer tower 4 through conduit 18 containing valve 19. Since this material is lighter than the normal overhead product of the demethylcyclopentanizer tower 50, it is effective in stripping out components which boil near to cyclohexane and thus these materials are not refluxed back to the tower in as great a quantity as they would be without the auxiliary reflux. The quantity of auxiliary reflux which can be used varies, but usually amounts to at least 20 volume percent and preferably over 50 percent of the total reflux. However, it is within the scope of the invention to employ any amount of this material, ranging from very small quantities up to the quantity required to completely exclude the normal reflux.

Many of the pumps, valves, etc., have been omitted from the drawing in order to simplify the explanation thereof; however, it is to be understood that the process includes such auxiliary equipment of this type which is necessary for the operation thereof.

The following examples are presented in illustration of an application of the invention and its advantages. First the details of an operation are given in which auxiliary reflux is not employed in the deisohexanizer and demethylcyclopentanizer towers. This is the conventional method of operating. Then an operation is described in accordance with the method of the invention. Equipment and flow streams are identified with reference to the drawing.

EXAMPLES

*Normal operation*

A hydrocarbon feed stock containing normal hexane and methylcyclopentane is charged to fractionation tower 4 at a rate of 9842 gallons per hour. Tower 4 which is the feed deisohexanizer tower has 44 trays in the top section and 31 in the bottom section, all trays operating at 80 percent efficiency. In the top section the average temperature is 229° F. and the average pressure is 60 p.s.i.g. In the bottom section the average temperature is 248° F. and the average pressure is 70 p.s.i.g. The reflux ratio is 7 to 1. The net overhead in line 16 is 3148 gallons per hour containing 2150 gallons per hour isohexanes. The bottoms product is passed to feed demethylcyclopentanizer tower 26.

Tower 26 has 41 trays in the top section and 47 trays in the bottom section operating at 80 percent efficiency. Average top section temperature is 252° F.; average pressure is 60 p.s.i.g. Average bottom temperature is 272° F.; average pressure is 65 p.s.i.g. Isoheptanes are withdrawn in the bottoms product and the overhead is fed to benzene dehydrogenation unit 40 and thence to isomerization unit 44. Hydrogenation is carried out using a nickel catalyst at 450° F. and 435 p.s.i.g. Isomerization is with aluminum chloride-hydrocarbon complex catalyst at 140° F., 185 p.s.i.g. and a contact time of 30 minutes.

Isomerization effluent at a rate of 5222 gallons per hour is fed to product demethylcyclopentanizer tower 50. In tower 50 the top section has 26 trays, the bottom section 39, all at 80 percent efficiency. The top section operates at an average of 248° F. and 70 p.s.i.g. The reflux ratio is 6 to 1. A cyclohexane product is withdrawn from the bottom of tower 50 through line 70. A fuel high in isohexane is yielded from top of tower 50 through line 62.

A material balance for this normal operation is shown in Table I.

*Operation with auxiliary reflux*

The same quantity and composition of feed as employed in the above example of normal operation is fed to column 4 operating under the same conditions as for normal operation except that the overhead material is not recycled to this tower. Instead auxiliary reflux is added through line 64, withdrawn from the overhead product of tower 50. Bottoms product of tower 4 is processed as in normal operation through tower 26, benzene hydrogenation and isomerization. Isomerization effluent is passed to tower 50 which operates under the same conditions given for normal operation except that the overhead material is not refluxed to this tower. Instead all the reflux is auxiliary reflux supplied through line 18 from the overhead product of tower 4. Tower loadings are substantially the same as for normal operation.

A material balance for this operation with auxiliary reflux is shown in Table I.

TABLE I.—MATERIAL BALANCE (GALLONS PER HOUR)

[Normal Operation]

| Component | Conduit Number | | | | | | | | | | | |
|---|---|---|---|---|---|---|---|---|---|---|---|---|
| | 2 | 6 | 14 | 16 | 24 | 46 | 52 | 60 | 62 | 70 | 18 | 64 |
| n-hexane | 2,529 | | 532 | 76 | 2,453 | 945 | | 5,580 | 930 | 15 | | |
| benzene | 530 | | | | 530 | | | | | | | |
| methylcyclopentane | 1,797 | | 14 | 2 | 1,795 | 379 | | 2,070 | 345 | 34 | | |
| 3-methylpentane | 1,628 | | 5,010 | 716 | 912 | 640 | | 3,600 | 600 | 40 | | |
| 2-methylpentane | 1,470 | | 7,658 | 1,094 | 376 | 910 | | 5,136 | 856 | 54 | | |
| 2,2-dimethylbutane | 103 | | 721 | 103 | | 383 | | 2,298 | 383 | | | |
| 2,3-dimethylbutane | 275 | | 1,659 | 237 | 38 | 342 | | 1,980 | 330 | 12 | | |
| cyclohexane | 463 | | | | | 463 | | 1,616 | 318 | 53 | 1,563 | |
| pentanes | 920 | | 6,440 | 920 | | | | | | | | |
| 2,2-dimethylpentane | 63 | | | | 63 | 4 | | | | 4 | | |
| 2,4-dimethylpentane | 64 | | | | 64 | 3 | | | | 3 | | |
| Total | 9,842 | | 22,036 | 3,148 | 6,694 | 5,222 | | 20,982 | 3,497 | 1,725 | | |

TABLE I.—Continued
Operation with Auxiliary Reflux

| Component | Conduit Number | | | | | | | | | | | |
|---|---|---|---|---|---|---|---|---|---|---|---|---|
| | 2 | 6 | 14 | 16 | 24 | 46 | 52 | 60 | 62 | 70 | 18 | 64 |
| n-hexane | 2,529 | 2,050 | | 342 | 2,878 | 1,106 | 2,800 | | 400 | 15 | 1,709 | 2,400 |
| benzene | 530 | | | | 530 | | | | | | | |
| methylcyclopentane | 1,797 | 575 | | 96 | 1,982 | 415 | 887 | | 127 | 7 | 479 | 760 |
| 3-methylpentane | 1,628 | 3,260 | | 544 | 1,737 | 1,214 | 2,930 | | 561 | | 2,716 | 3,369 |
| 2-methylpentane | 1,470 | 6,770 | | 1,130 | 621 | 1,270 | 6,910 | | 989 | | 5,640 | 5,921 |
| 2,2-dimethylbutane | 103 | 1,800 | | 300 | | 480 | 1,980 | | 283 | | 1,500 | 1,697 |
| 2,3-dimethylbutane | 275 | 2,002 | | 334 | 142 | 512 | 2,180 | | 311 | | 1,668 | 1,869 |
| cyclohexane | 463 | 348 | | 58 | 674 | 1,738 | 652 | | 93 | 1,376 | 290 | 559 |
| pentanes | 920 | 3,220 | | 537 | | | 2,683 | | 383 | | 2,683 | 2,300 |
| 2,2-dimethylpentane | 63 | | | | 63 | 4 | | | | 4 | | |
| 2,4-dimethylpentane | 64 | | | | 64 | 2 | | | | 2 | | |
| Total | 9,842 | 20,025 | | 3,341 | 8,691 | 6,741 | 22,022 | | 3,147 | 1,404 | 16,685 | 18,875 |

The above material balance data are based upon equilibrium calculations. These data demonstrate that the use of auxiliary reflux according to the invention permits n-hexane and methylcyclohexane to be recycled to isomerization without increasing tower loadings. In Example I 4248 g.p.h. of these materials are fed through line 24 whereas in Example II the n-hexane/methylcyclohexane feed is 4860 g.p.h.

Also the condenser load is reduced for column 4 and for column 50. In Example I the total overhead material (lines 14 plus 16) is 25,184 g.p.h. from tower 4 and 24,479 g.p.h. from tower 50 (lines 60 plus 62). In Example II the tower 4 overhead is 20,025 g.p.h. (line 6) and the tower 50 overhead is 22,022 g.p.h. (line 52).

In product improvement the net result shows up in the yield of tower 4 through line 16. In Example I the gasoline yield is 3148 g.p.h. containing 2150 g.p.h. isohexanes. In Example II this yield is 3341 g.p.h. gasoline containing 2308 g.p.h. isohexanes. The overhead yield of tower 50 is less in Example II, 3147 g.p.h. compared with 3497 g.p.h., (line 62) but is much richer in isohexanes, i.e., 68 percent compared with 55 percent for Example I. The same is true of the bottoms product of tower 50. There is less yield, 1404 g.p.h. compared with 1725 g.p.h., (line 70) but this yield is 98 percent cyclohexane while that of Example I is only 91 percent cyclohexane.

The above examples show the maximum benefits under a given set of conditions by completely replacing the reflux streams of both towers 4 and 50 with auxiliary reflux. It should be appreciated, however, that some of the advantages can be enjoyed by only partially replacing the conventional reflux streams with auxiliary reflux. Little is to be gained, however, if less than 20 percent of the refluxed material is obtained from the auxiliary source. Preferably over half of the reflux of each column is auxiliary reflux from the other column.

It should also be realized that many of the demonstrated advantages can be gained by using auxiliary reflux in the first tower (4) only. This enables recycle of normal hexane and methylcyclopentane with the consequent increases in isohexane yield. The most favored aspect, however, is that illustrated by the examples where all reflux for both towers is obtained from the other tower.

Having thus described the invention by providing a specific example thereof it is to be understood that no undue limitations or restrictions are to be drawn by reason thereof and that many variations and modifications are within the scope of the invention.

I claim:

1. In a process in which a hydrocarbon stream comprising isohexanes, methylcyclopentane and normal hexane is fractionated in a first fractional distillation zone to separate a product rich in isohexanes from a stream containing normal hexane and methylcyclopentane which are subjected to isomerization conditions to form therefrom isohexanes and cyclohexane in an effluent stream, and said effluent stream is fractionated in a second fractional distillation zone to separate cyclohexane and produce an overhead fraction, the improvement which comprises refluxing the first fractional distillation zone with at least a portion of said overhead fraction from the second fractional distillation zone.

2. The process of claim 1 wherein over 50 volume percent of the total reflux in said first fractional distillation zone is obtained from the overhead stream of said second fractional distillation zone.

3. The process of claim 1 wherein the total reflux in said first fractional distillation zone is obtained from the overhead stream of said second fractional distillation zone.

4. In a process in which a hydrocarbon stream comprising isohexanes, methylcyclopentane and normal hexane is fractionated in a first fractional distillation zone to separate as a first overhead fraction a product rich in isohexanes from a stream containing normal hexane and methylcyclopentane which are subjected to isomerization conditions to form therefrom isohexanes and cyclohexane in an effluent stream, and said effluent stream is fractionated in a second fractional distillation zone to separate cyclohexane, as a distillation residue, from isohexanes as a second overhead fraction, the improvement which comprises refluxing the first fractional distillation zone with at least a portion of said second overhead fraction, and refluxing the second fractional distillation zone with at least a portion of said first overhead fraction.

5. The process of claim 4 wherein over 50 volume percent of the total reflux in each of said fractional distillation zones is obtained from the overhead fraction of the other fractional distillation zone.

6. The process of claim 4 wherein the total reflux in each of said fractional distillation zones is obtained from the overhead fraction of the other fractional distillation zone.

7. In a process in which a hydrocarbon feed comprising isohexanes, methylcyclopentane, and normal hexane is fractionated in a first fractional distillation zone to separate a product rich in isohexanes, the remainder of said feed is fractionated in a second fractional distillation zone to separate a material rich in methylcyclopentane and normal hexane, said material rich in methylcyclopentane and normal hexane is isomerized whereby methylcyclopentane is converted to cyclohexane and normal hexane is converted to isohexanes, and the isomerization reaction effluent is fractionated in a third fractional distillation zone to recover a product rich in cyclohexane and an overhead fraction, the improvement which comprises refluxing the first fractional distillation zone with at least a portion of said overhead fraction from the third fractional distillation zone.

8. In a process in which a hydrocarbon feed comprising isohexanes, methylcyclopentane, normal hexane and heavier components is fractionated in a first fractional distillation zone to separate a product rich in isohexanes, the remainder of said feed is fractionated in a second fractional distillation zone to separate a material rich in methylcyclopentane and normal hexane, said material rich in methylcyclopentane and normal hexane is isomerized in the presence of an aluminum halide catalyst at a temperature of 90 to 160° F., a pressure of 150–300 p.s.i.g. and a contact time of 0.1 to 5 hours whereby methylcyclopentane is converted to isohexanes and the methylcyclopentane is converted to isohexanes and the isomerization effluent is fractionated in a third fractional distillation zone to separate cyclohexane and recover in an overhead fraction a product containing methylcyclopentane, the improvement which comprises refluxing the first fractional distillation zone with at least a portion of said overhead fraction from the third fractional distillation zone.

9. In a process in which a hydrocarbon feed comprising isohexanes, methylcyclopentane, normal hexane and heavier components is fractionated in a first fractional distillation zone to separate as a first overhead fraction a product rich in isohexanes, the remainder of said feed is fractionated in a second fractional distillation zone to separate a material rich in methylcyclopentane and normal hexane, said material rich in methylcyclopentane and normal hexane is isomerized whereby methylcyclopentane is converted to cyclohexane and normal hexane is converted to isohexanes; and the isomerization reaction effluent is fractionated in a third fractional distillation zone to recover a product rich in cyclohexane and a second overhead fraction, the improvement which comprises refluxing the first fractional distillation zone with at least a portion of said second overhead fraction and refluxing the third fractional distillation zone with at least a portion of said second overhead fraction.

10. In a process in which a hydrocarbon feed comprising isohexanes, methylcyclopentane, normal hexane and heavier components is fractionated in a first fractional distillation zone to separate as a first overhead fraction a product rich in isohexanes, the remainder of said feed is fractionated in a second fractional distillation zone to separate a material rich in methylcyclopentane and normal hexane, said material rich in methylcyclopentane and normal hexane is isomerized in the presence of an aluminum halide catalyst at a temperature of 90 to 160° F., a pressure of 150 to 300 p.s.i.g. and a contact time of 0.1 to 5 hours, whereby methylcyclopentane is converted to cyclohexane and normal hexane is converted to isohexanes and the isomerization effluent is fractionated in a third fractional distillation zone to separate cyclohexane and recover from a second overhead fraction a product containing methylcyclopentane, the improvement which comprises refluxing the first fractional distillation zone with at least a portion of said second overhead fraction and refluxing the third fractional distillation zone with at least a portion of said first overhead fraction.

11. In a process in which a hydrocarbon feed comprising benzene, isohexanes, methylcyclopentane, normal hexane and heavier components is fractionated in a first fractional distillation zone to separate a product rich in isohexanes, the remainder of said feed is fractionated in a second fractional distillation zone to separate a material rich in methylcyclopentane and normal hexane and containing benzene, said material rich in methylcyclopentane and normal hexane is hydrogenated with a hydrated nickel oxide catalyst in the presence of hydrogen at a temperature between about 360° F. and about 500° F. whereby the benzene in said material is converted to cyclohexane, hydrogen is separated from the hydrogenation reaction effluent, said effluent is isomerized with a metal halide-hydrocarbon complex catalyst at a temperature between about 90° F. and about 160° F., a pressure of 150 to 300 p.s.i.g. and a contact time of 0.1 to 5 hours, whereby normal hexane is converted to isohexanes and methylcyclopentane is converted to cyclohexane and the isomerization reaction effluent is fractionated in a third fractional distillation zone to separate cyclohexane and recover from an overhead fraction a product rich in methylcyclopentane, the improvement which comprises refluxing the first fractional distillation zone with at least a portion of said overhead fraction from the third fractional distillation zone.

12. In a process in which a hydrocarbon feed comprising benzene, isohexanes, methylcyclopentane, normal hexane and heavier components is fractionated in a first fractional distillation zone to separate as a first overhead fraction a product rich in isohexane, the remainder of said feed is fractionated in a second fractional distillation zone to separate a material rich in methylcyclopentane and normal hexane and containing benzene, said material rich in methylcyclopentane and normal hexane is hydrogenated with a hydrated nickel oxide catalyst in the presence of hydrogen at a temperature between about 360° F. and about 500° F. whereby the benzene in said material is converted to cyclohexane, hydrogen is separated from the hydrogenation reaction effluent, said effluent is isomerized with a metal halide-hydrocarbon complex catalyst at a temperature between about 90° F. and about 160° F., a pressure of 150 to 300 p.s.i.g. and a contact time of 0.1 to 5 hours, whereby hexane is converted to isohexanes and methylcyclopentane is converted to cyclohexane and the isomerization reaction effluent is fractionated in a third fractional distillation zone to separate cyclohexane and recover from a second overhead fraction a product rich in methylcyclopentane, the improvement which comprises refluxing the first fractional distillation zone with at least a portion of said second overhead fraction and refluxing the third fractional distillation zone with at least a portion of said first overhead fraction.

13. The process of claim 12 wherein the total reflux used in said first fractional distillation zone is obtained from said second overhead fraction and the total reflux used in said third fractional distillation zone is obtained from said first overhead fraction.

References Cited in the file of this patent

UNITED STATES PATENTS

| | | |
|---|---|---|
| 2,396,331 | Marschner | Mar. 12, 1946 |
| 2,493,499 | Perry | Jan. 3, 1950 |
| 2,562,926 | Legatski | Aug. 7, 1951 |
| 2,905,736 | Belden | Sept. 22, 1959 |

UNITED STATES PATENT OFFICE
CERTIFICATE OF CORRECTION

Patent No. 2,999,890 September 12, 1961

Joseph W. Davison

It is hereby certified that error appears in the above numbered patent requiring correction and that the said Letters Patent should read as corrected below.

Column 9, line 30, for "second" read -- first --.

Signed and sealed this 10th day of April 1962.

(SEAL)
Attest:

ERNEST W. SWIDER
Attesting Officer

DAVID L. LADD
Commissioner of Patents